United States Patent [19]

Webb et al.

[11] Patent Number: 5,098,795
[45] Date of Patent: Mar. 24, 1992

[54] COMPOSITE METAL FOIL AND CERAMIC FABRIC MATERIALS

[75] Inventors: Brent J. Webb; Zen I. Antoniak, both of Richland, Wash.; John T. Prater, Chapel Hill, N.C.; John G. DeSteese, Kennewick, Wash.

[73] Assignee: Battelle Memorial Institute, Richland, Wash.

[21] Appl. No.: 231,140

[22] Filed: Aug. 10, 1988

[51] Int. Cl.$^5$ .......................... B32B 5/08; B32B 15/04
[52] U.S. Cl. .................................... 428/594; 428/608; 428/621; 165/46
[58] Field of Search ................ 428/608, 621, 594, 245, 428/251, 285, 457, 902; 165/46, 41, 905; 220/450, 452, 905, DIG. 11

[56] References Cited

U.S. PATENT DOCUMENTS

| | | | |
|---|---|---|---|
| 2,510,999 | 6/1950 | Oldofredi | 428/608 |
| 2,668,348 | 2/1954 | Hubbell | 428/608 |
| 2,676,773 | 4/1954 | Sanz et al. | 220/450 |
| 2,698,991 | 6/1955 | Mesick | 428/608 |
| 3,086,284 | 4/1963 | Schefky | 428/608 |
| 3,107,498 | 10/1963 | Messer | 220/452 |
| 3,199,715 | 8/1965 | Pairanas | 220/450 |
| 3,540,615 | 11/1970 | Paine | 220/450 |
| 3,615,276 | 10/1971 | Singleton | 428/608 |
| 3,660,215 | 5/1972 | Pawlicki | 428/593 |
| 3,814,275 | 6/1974 | Lemons | 220/450 |
| 3,900,150 | 8/1975 | Delgrosso et al. | 428/608 |
| 3,948,295 | 4/1976 | Lemont et al. | 428/608 |
| 4,037,751 | 7/1977 | Miller et al. | 428/593 |
| 4,168,013 | 9/1979 | King et al. | 220/450 |
| 4,212,347 | 7/1980 | Eastman | 165/46 |
| 4,260,441 | 4/1981 | Preud | 428/593 |
| 4,842,045 | 6/1989 | Reinmuller | 165/46 |
| 4,867,230 | 9/1989 | Voss | 165/46 |
| 4,877,689 | 10/1989 | Orstotz | 428/623 |

OTHER PUBLICATIONS

Webb et al., "Rotating Bubble Membrane Radiator for Space Applications".
Merrigan et al., "Heat Technology Develoment for High Temperature Space Radiator Applications", Los Alamos National Laboratory, Los Alamos, N.M.
R. Ponnappan, "Conceptual Design of An 1 m Long 'Roll Out Fin' Type Expandable Space Radiator", University Energy Systems, Inc., Dayton, Ohio.
L. C. Chow et al., "Fluid Recirculation, Deployment and Retraction of an Expandable Pulse Power Radiator", AIAA/ASME 4th Joint Thermophysics & Heat Transfer Conference.
M. A. Covington et al., "Optical Properties of Woven Ceramic Fabrics for Flexible Heat Shields", AIAA/ASME 4th Joint Thermophysics and Heat Transfer Conference, Jun. 2-4, 1986, Boston, Mass.
Tai-il Mah et al., "Recent Development in Fiber-Reinforced High Temperature Ceramic Composites", Ceramic Bulletin, vol. 66, No. 2, 1987.
J. T. Prater et al., "Development of Materials for Fabric Radiators", Aug. 1987, 5th Symposium on Space Nuclear Power Systems, Albuquerque, N.M.

Primary Examiner—John J. Zimmerman
Attorney, Agent, or Firm—Wells, St. John & Roberts

[57] ABSTRACT

The invention comprises new materials useful in a wide variety of terrestrial and space applications. In one aspect, the invention comprises a flexible cloth-like material comprising a layer of flexible woven ceramic fabric bonded with a layer of metallic foil. In another aspect, the invention includes a flexible fluid impermeable barrier comprising a flexible woven ceramic fabric layer having metal wire woven therein. A metallic foil layer is incontinuously welded to the woven metal wire. In yet another aspect, the invention includes a material comprising a layer of flexible woven ceramic fabric bonded with a layer of an organic polymer. In still another aspect, the invention includes a rigid fabric structure comprising a flexible woven ceramic fabric and a resinous support material which has been hardened as the direct result of exposure to ultraviolet light. Inventive methods for producing such material are also disclosed.

11 Claims, 3 Drawing Sheets

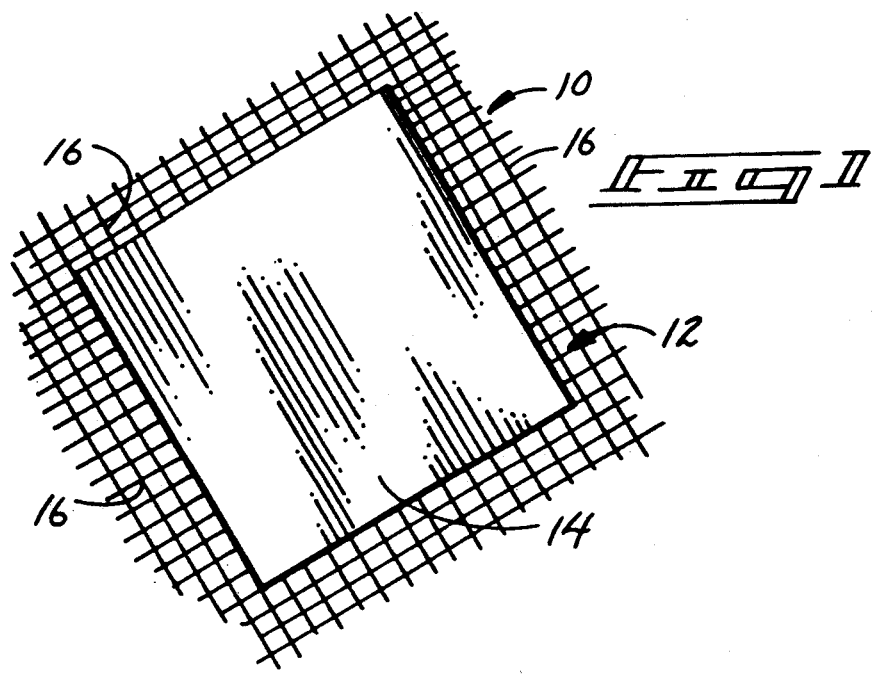
FIG. 1
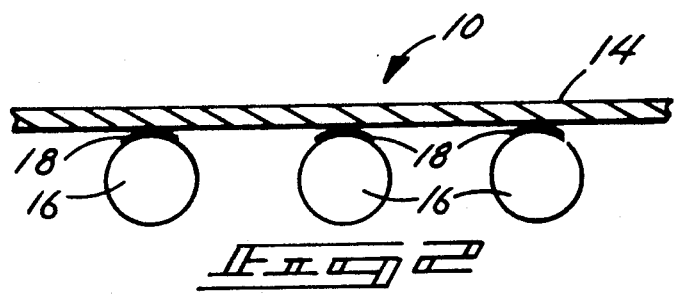
FIG. 2
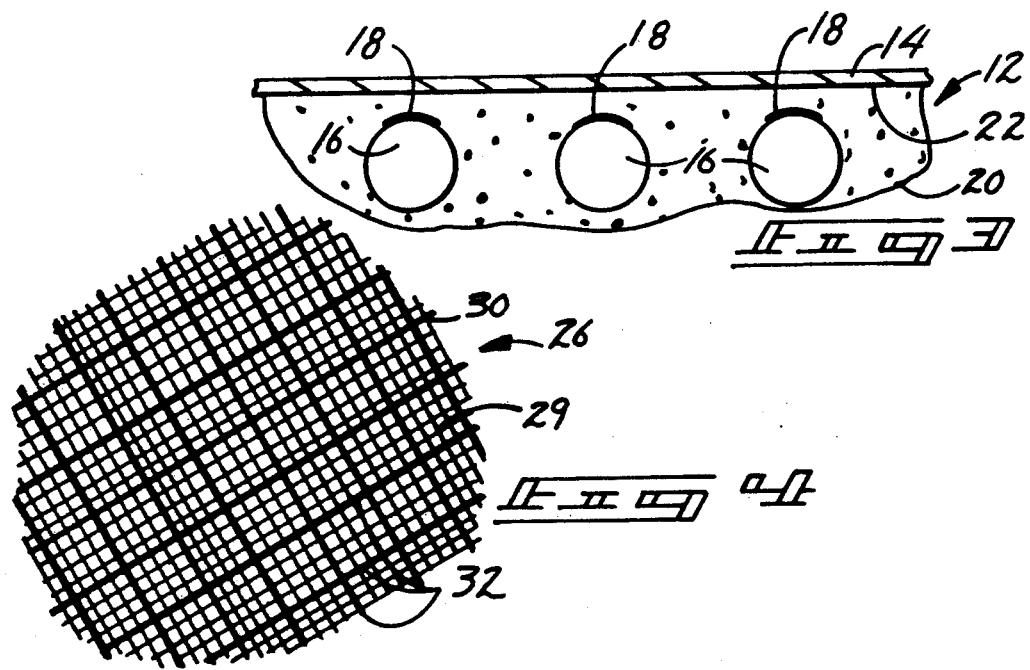
FIG. 3
FIG. 4

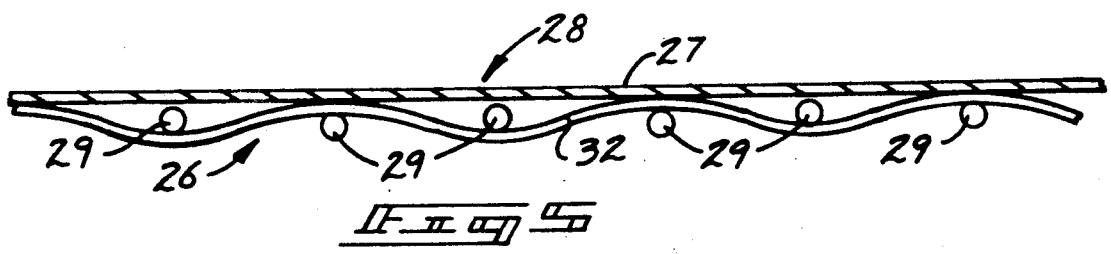
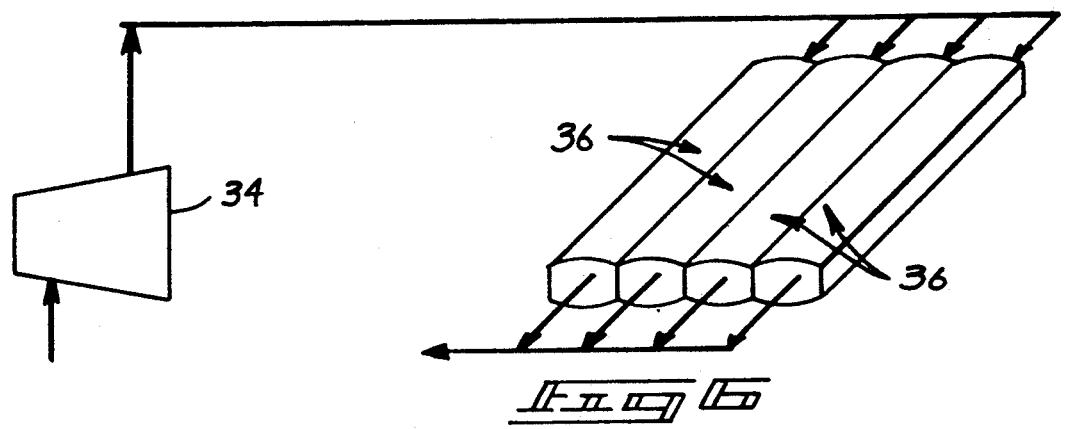
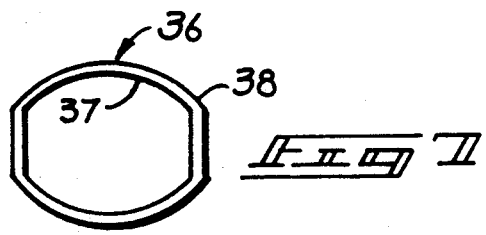
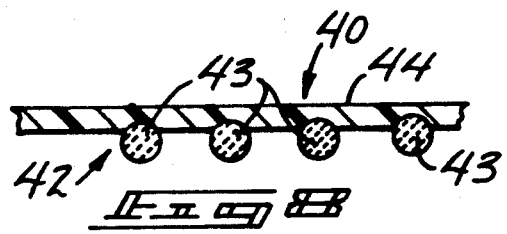
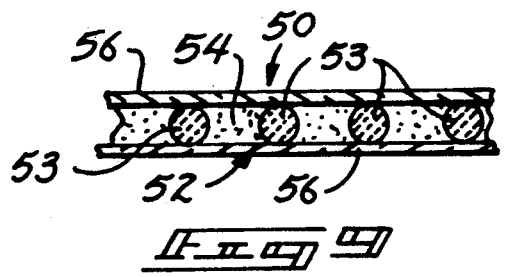

COMPOSITE METAL FOIL AND CERAMIC FABRIC MATERIALS

This invention was made with government support under Contract No. DE-AC06-76RLO 1830 awarded by the U.S. Department of Energy. The government has certain rights in the invention.

TECHNICAL FIELD

This invention relates generally to ceramic fabric materials. More particularly, the invention relates to incorporation of such materials into a wide range of articles of manufacture for terrestrial and space applications.

BACKGROUND OF THE INVENTION

The invention arose primarily out of the needs and concerns associated with space based radiators which reject large amounts of heat from spacecraft power plants. Radiator designs for rejecting heat from space-based power plants place a premium on weight savings, survivability and launch volume. Preferably, the radiators will be flexible for folding or rolling into a small launch volume. The radiator would be expanded in space. Flexible radiators offer benefits such as adaptability to variable heat load, and are retractable when not in use to enhance survivability.

Such features have already been incorporated into flexible heat pipes and other radiators, but it is not clear at this time if such concepts will truly be workable in a space environment. For example, Merrigan et al., PROC-849453, "*Heat Pipe Technology Development for High Temperature Space Radiator Applications*," a paper presented at the Proc. 19th Intersociety Energy Conversion Engineering Conference in 1984, teaches the use of flexible, segmented metal heat pipes for high temperature space radiator applications. Ponnappan et al., "*Conceptual Design of a 1 m Long 'Roll Out Fin' Type Expandable Space Radiator*," a paper presented at the AIAA/ASME 4th Joint Thermophysics and Heat Transfer Conference in 1986, discloses an expandable roll out radiator comprised of two thin walled sheets sealed along their edges and formed into a spiral coil. The roll out fin is stated as being manufactured from either a thin metallic foil 51 microns thick or a plastic film with a coil spring. Chow et al., "*Fluid Recirculation, Deployment and Retraction of an Expandable Pulse Power Radiator*," a paper also presented at the 1986 Trans. AIAA/ASME 4th Joint Thermophysics and Heat Transfer Conference, discloses a radiator made of a low-density, thin flexible material that can be collapsed and stored in a compact form and can be expanded readily when high peak power heat loads are imposed.

This invention is directed to improvements over the above and other prior art space radiator materials. However, as will be described below, the technology of the invention will be applicable in other space and terrestrial applications.

BRIEF DESCRIPTION OF THE DRAWINGS

Preferred embodiments of the invention are illustrated in the accompanying drawings, in which:

FIG. 1 is a perspective view of a flexible material in accordance with the invention;

FIG. 2 is an enlarged partial cross-sectional view of the FIG. 1 material;

FIG. 3 is an enlarged partial cross-sectional view of a flexible material and is illustrative of an invention method for producing the material of FIG. 1;

FIG. 4 is a perspective view of a ceramic fabric having interwoven metal wire in accordance with the invention;

FIG. 5 is a cross-sectional view of a flexible material comprising the fabric of FIG. 4;

FIG. 6 is a diagrammatic view of a space based radiator in accordance with the invention;

FIG. 7 is an enlarged cross-sectional plan view of a radiator conduit of FIG. 6;

FIG. 8 is a cross-sectional view of an alternate material in accordance with the invention;

FIG. 9 is a cross-sectional view of another alternate material in accordance with the invention;

DESCRIPTION OF THE PREFERRED EMBODIMENTS

Figure 10:
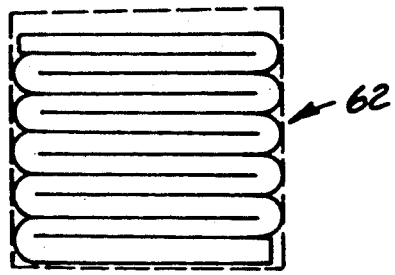
FIG. 10 is a side elevational view of a structure comprised of the material of FIG. 9 and shown in its compacted state.

The following disclosure of the invention is submitted in compliance with the constitutional purpose of the Patent Laws "to promote the progress of science and useful arts" (Article 1, Section 8).

Referring to FIGS. 1 and 2, a flexible cloth-like material in accordance with one aspect of the invention is indicated generally by reference numeral 10. Material 10 is comprised of a layer of flexible woven ceramic fabric 12 and a metallic foil layer 14 which are bonded together. For purposes of this document, the term "ceramic" is defined as any man-made, solid material that is neither metallic nor organic. Examples of such ceramic materials include silica, silicon carbide, aluminoborosilicates, and graphite. Ceramic fabric 12 is comprised of a plurality of interwoven strands or threads 16 having a thread diameter of preferably from 50 to 1000 microns, with 250 microns being typical. Typically, the tighter the desired weave, the smaller the thread or strand diameter should be. Filaments which are gathered or twisted to form the threads will preferably have diameters from 10 to 40 microns.

Metallic foil layer 14 will typically comprise a continuous sheet of thin metal which provides a fluid impermeable barrier. In some applications, it may be desirable to make layer 14 fluid permeable to allow transfer of fluid from one side of material 10 to the other. In either event, metallic foil layer 14 is preferably less than about 50 microns in thickness to facilitate flexibility and minimize the weight of the finished material. The metallic foil could be comprised of any desired metal depending upon the anticipated use of an article of manufacture incorporating the material, as will be described below.

The bonding of foil layer 14 with ceramic fabric layer 12 can be substantially continuous or alternately at a plurality of spaced, discrete sites or along lines. Bonding at a plurality of spaced locations facilitates or enhances flexibility of the material and also tends to reduce weight. Where material 10 is to be used as fluid impermeable material for a vessel, very minimal bonding may be required. For purposes of this document, the term "vessel" is defined as any container or conduit in which a fluid is contained, conveyed, or circulated. For vessels, it is preferred that metallic foil layer 14 would be displaced toward the fluid side of the vessel, with ceramic fabric layer 12 being displaced toward the external portion of the vessel. This would enable pressure from the fluid within the vessel to force foil layer 14 outwardly against ceramic fabric layer 12. With such a configuration, bonding might only be required at widely spaced locations to facilitate proper positioning of foil layer 14 relative to ceramic fabric 12 when the vessel is less than completely full.

Suitable adhesives, such as silicon based adhesives, can be interposed between ceramic fabric layer 12 and foil layer 14 for bonding. The particular adhesive used would depend upon the anticipated use of an article of manufacture incorporating the material. For example, the adhesive should be compatible with any fluid in which it comes into contact, and the temperature and pressure of the article's operating environment.

Bonding between the metallic foil and ceramic fabric could also be by welding, and more specifically brazing. Fabric sheet 10 of FIGS. 1 and 2 illustrates metallic foil layer 14 being continuously brazed to ceramic fabric 12. As metal is not typically directly brazable to most ceramic materials, the fibers or threads 16 of fabric 12 are pre-tinned to provide a metallized surface 18 thereon to which metallic foil layer 14 is brazed.

FIG. 3 is illustrative of one method by which such a metallic layer 14 can be applied to a ceramic fabric 12. At least one surface of the ceramic fabric threads 16 would be metallized or otherwise tinned to provide a suitable bonding surface 18 on the threads. A temporary filler material 20 would then be impregnated into and throughout ceramic fabric 12. Filler material 20 forms a continuous temporary surface 22 immediately adjacent metallized surfaces 18 of ceramic threads 16. The temporary filler material can be of any suitable material which has a lower melting temperature than the particular metal or alloy layer 14 (and correspondingly a lower temperature than the ceramic material), and which is non-corrosive to the metal and ceramic material. The material will typically be a plastic-like, organic, or resinous material such as, for example wax.

Metallic foil layer 14 is then applied to temporary surface 22 of filler material 20. Layer 14 can be applied as a pre-formed metal foil sheet which is pressed against surface 22. An appropriate brazing material is applied to foil layer 14 before pressing it against surface 22. Alternately, foil layer 14 can be formed on surface 22 such as by electroless or vapor depositing the metal onto surface 22. In this case, a brazing material would be applied to the metallized fabric before impregnating it will filler material 20. In either event, heat is next applied either within a furnace or by some other direct means to melt temporary filler 20 away from fabric 12 and cause metal layer 14 to contact and braze to ceramic threads 16. A material having a cross-section like that of FIG. 2 is produced. Threads 16 of ceramic fabric 12 could of course be metallized at spaced locations to provide finished spaced bonding points as desired.

FIGS. 4 and 5 illustrate an alternate ceramic fabric 26, and a material sheet 28 incorporating ceramic fabric 26 in accordance with another aspect of the invention. Fabric 26 differs from fabric 12 in that fabric 26 incorporates metal wire 30 which is interwoven or stitched with its ceramic threads 29. Individual strands 32 of wire 30 in FIG. 4 are illustrated as being larger than ceramic threads 29 for clarity. Wire 30 is however preferably from 5 to 10 mils (125 microns to 250 microns) in diameter as compared to a typical ceramic fabric thread diameter of 250 microns.

Wire 30 is woven within the ceramic fabric threads 29 to provide spaced wire strands 32 which form a repetitive checkerboard pattern as illustrated. Adjacent wire strands in the pattern are preferably spaced from one another about at least one-eighth inch apart to produce a finished material having bonding along intermittent lines. Wire strands 32 could also of course be woven closer together with ceramic threads 29 to achieve more continuous bonding if desired. This would typically provide a corresponding increase in weight. Wire 30 can be either interwoven with threads 29 as the fabric is formed, or alternately woven after fabric formation by stitching wire 30 throughout the fabric.

A metallic foil layer 27 is then bonded to ceramic fabric 26 by welding foil 27 to the exposed portions of the metal wire on at least one surface of ceramic fabric 26 to produce a material 28, as illustrated in FIG. 5. In this manner, metallic foil layer 27 is incontinuously welded to woven metal wire strands 32 as layer 27 is only welded to exposed portions of the wire present on one surface of the fabric. Where the welding employs a filler material, the filler material can be applied to metal wire 30 either before or after it is woven with ceramic threads 29 into fabric 26. Preferably, the welding is by brazing, with the brazing material being applied to wire 30 before weaving it with ceramic threads 29 into a fabric 26. Metallic foil layer 27 is preferably brazed to fabric 26 in an oxygen evacuated furnace to prevent formation of oxides.

The discussion proceeds with reference to a specific example of bonding of a metal layer to a ceramic fabric having interwoven threads. Steel wire of 10 mil (app. 250 microns) diameter was stitched into an aluminoborosilicate ceramic fabric at about 2.5 cm separations forming a grid like pattern. A sandwich of the fabric, a 25 microns thick layer of Ag-Cu-Pd alloy brazing material, and a 25 microns thick foil of steel was assembled and loaded into a vacuum furnace with the fabric layer on top. The sandwich was pressed between two alumina disks and weighted with a block of steel. The furnace was evacuated to about $1 \times 10^{-7}$ torr and then slowly heated over three hours to 1000° C. After holding for five minutes, the furnace power was turned off and the sample furnace cooled overnight. The finished fabric was repeatably bendable about a 1 cm mandrel.

The above described materials can be adapted for any of a wide variety of uses. FIGS. 6 and 7 diagrammatically illustrate how conduit 36 fabricated from the inventive material might be employed in a space based radiator system. A compressed and heat working fluid that drives a turbine 34 would be channeled from turbine 34 through radiator conduit 36 for exhausting heat to the space environment. Conduit 36 would be constructed such that the metallic film or layer 37 is received on the internal portion of the conduit with a ceramic fabric outer skin 38 providing the desired structural support and integrity. In manufacturing such conduit, the metallic film could be applied to the fabric's skeleton before fabrication into a conduit, or alternately inserted and joined after formation of the conduit skeleton. The metal film or layer would be comprised of an appropriate metal which would not be corroded by the working fluid. For example, many space based power systems employ a working fluid of a HeXe mixture. Aluminum, titanium, and nickel, or alloys thereof, would be appropriate metals that would not be degraded by a HeXe working fluid. Such radiator conduit would be flexible and thereby capable of being folded or rolled into a compact volume for launch or when not in use.

A wide variety of other vessels could also incorporate material of the invention. Examples include diesel or gasoline fuel storage tanks, in-orbit cryogenic fuel storage tanks, bubble membrane radiators, etc.

Many other articles of manufacture could advantageously incorporate materials in accordance with the invention. For example, the material could be used for blankets, tarps, tents, temporary structures, clothing, etc. Depending on the particular application, the material may not need to be entirely fluid impermeable.

The above described and illustrated material is illustrated as consisting of only two layers. However, it is to be understood that material of the invention could comprise other layers as may be desired for additional structural integrity or other functional purposes. For example, radiator conduit made from the inventive material might also include an internal fabric wicking layer as is commonly used with radiator conduit to enhance heat transfer characteristics.

FIG. 8 illustrates an alternate material 40 in accordance with the invention. Material 40 comprises a layer of flexible woven ceramic fabric 42 having ceramic threads 43, and a sheeting layer 44 of an organic polymer, such as plastic, mylar, polyethylene, etc. With this concept, ceramic fabric 42 is used as a reinforcing member for sheeting 44 of the organic polymer. The plastic, mylar, etc. is preferably melt bonded to individual threads 43 of the ceramic fabric 42. A sheet 44 of the organic polymer would first be applied against ceramic fabric 42. Fabric 42 and organic polymer 44 are then heated to at or very near the melting temperature of the polymer. This at least partially melts the polymer sheet onto the ceramic fabric to produce a bonded composite structure as shown in FIG. 8. Note that with such a structure the bonding is substantially continuous throughout fabric 40 as bonding occurs with substantially each thread 43 of fabric 42. The strength, mass/area, and flexibility of the finished fabric composite 40 is determined based upon the thickness and flexibility of the organic polymer, the fabric weave, and the degree of heat treatment. As with the combination ceramic fabric and metal foil materials 10 and 28 described above, the ceramic fabric and organic polymer combination material 40 would have a variety of uses in various articles of manufacture.

FIG. 9 illustrates another aspect of the invention in the form of a rigid ceramic fabric structure material 50. With this concept a ceramic fabric 52 comprised of ceramic threads is combined or treated with a hardening resin material 54. Resin material 54 is substantially of a fluid or gel-like consistency until it is exposed to ultraviolet light which causes it to harden. Examples of such resin are silicon dioxide glass matrices containing an ultraviolet light activated material; Herculite XR sold by Kerr Manufacturing of Romulus, Mich. is an example of such a resin. This will enable compact storage or transport of a given structure for launching into space, for example, followed by subsequent deployment of the structure in the finished form. The resin is then exposed to ultraviolet light to cause hardening into a self-supporting structure.

In manufacture, flexible woven ceramic fabric 52 would be combined with ultraviolet light activated resinous material 54 to form a composite. As illustrated in FIG. 9, layers or clear plastic sheeting 56 can be applied to opposite sides of the composite if necessary to assist in retaining material 54 relative to fabric 52. Sheeting 56 could be made of any material which is transmissive to ultraviolet radiation for later hardening of the resin to form a rigid composite. With the resin in its unhardened state, the composite could then be folded, rolled or otherwise compacted into some first predetermined shape having a first predetermined volume for transport, storage, or launch purposes. Once the structure is ready to be constructed in place, the composite is deployed into its desired second predetermined shape having a larger second predetermined volume. The deployed composite is then exposed to ultraviolet light, such as the sun's rays, to harden the resin and correspondingly the composite into the desired second predetermined shape of the structure. Clear plastic layers 56 can then be pealed away.

Figure 11:
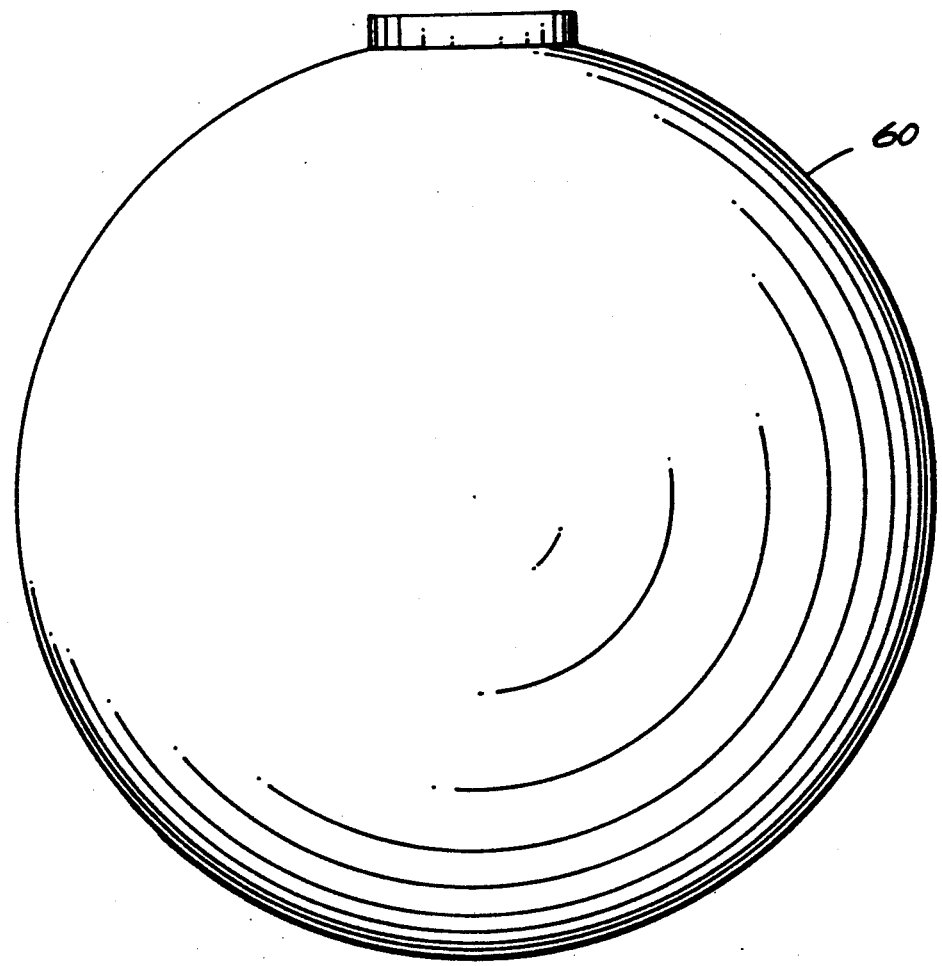
FIG. 11 is a side elevational view of the structure of FIG. 10 illustrated in its expanded or fully deployed state.

FIGS. 10 and 11 illustrate this concept. FIG. 11 illustrates a simple spherical tank 60 made of the material of FIG. 9 in its fully deployed and hardened condition. FIG. 10 illustrates tank 60 in a folded state and received within a container 62 before deployment and activation of the resin. When desired, the folded tank could be expanded by filling it with a fluid and subsequently exposing it to ultraviolet radiation to permanently rigidify the structure.

In compliance with the statute, the invention has been described in language more or less specific as to structural and methodical features. It is to be understood, however, that the invention is not limited to the specific features shown and described, since the means and construction herein disclosed comprise preferred forms of putting the invention into effect. The invention is, therefore, claimed in any of its forms or modifications within the proper scope of the appended claims, appropriately interpreted in accordance with the doctrine of equivalents.

We claim:

1. A flexible material comprising a layer of flexible woven ceramic fabric bonded by brazing with a layer of metallic foil, the flexible ceramic fabric layer comprising interwoven metal wire, the metallic foil layer being incontinuously brazed to the metal wire.

2. The flexible material of claim 1 wherein the metal wire is provided within the ceramic fabric layer in spaced wire strands which form a predetermined pattern, with adjacent wire strands in the pattern being spaced from one another about at least one-eighth inch apart.

3. A flexible fluid impermeable barrier comprising:
   a flexible woven ceramic fabric layer, the fabric having metal wire woven therein; and
   a metallic foil layer lining the ceramic fabric, the metallic foil layer being incontinuously welded to the woven metal wire.

4. The flexible fluid impermeable barrier of claim 3 wherein the metallic foil layer is less than about 50 microns in thickness.

5. The flexible fluid impermeable barrier of claim 3 wherein the metal wire woven into the ceramic fabric comprises a preapplied brazing material about its surface.

6. The flexible fluid impermeable barrier of claim 3 wherein the metal wire is provided within the ceramic fabric layer in spaced wire strands which form a predetermined pattern, with adjacent wire strands in the pattern being spaced from one another about at least one-eighth inch apart.

7. The flexible fluid impermeable barrier of claim 3 wherein the metal wire woven into the ceramic fabric comprises a preapplied brazing material about its surface; and wherein the metal wire is provided within the ceramic fabric layer in spaced wire strands which form a predetermined pattern, with adjacent wire strands in the pattern being spaced from one another about at least one-eighth inch apart.

8. A space based radiator incorporating the flexible fluid impermeable barrier of claim 3.

9. A vessel having fluid retaining walls incorporating the material of claim 3.

10. A heat pipe having fluid retaining walls incorporating the material of claim 3.

11. Clothing incorporating the material of claim 3.

* * * * *